US011714675B2

(12) United States Patent
Brooker et al.

(10) Patent No.: US 11,714,675 B2
(45) Date of Patent: *Aug. 1, 2023

(54) VIRTUALIZATION-BASED TRANSACTION HANDLING IN AN ON-DEMAND NETWORK CODE EXECUTION SYSTEM

(71) Applicant: Amazon Technologies, Inc., Seattle, WA (US)

(72) Inventors: Marc John Brooker, Seattle, WA (US); Mikhail Danilov, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,380

(22) Filed: Sep. 10, 2021

(65) Prior Publication Data

US 2022/0004423 A1 Jan. 6, 2022

Related U.S. Application Data

(63) Continuation of application No. 16/447,797, filed on Jun. 20, 2019, now Pat. No. 11,119,809.

(51) Int. Cl.
*G06F 9/46* (2006.01)
*H04L 67/02* (2022.01)

(52) U.S. Cl.
CPC .............. *G06F 9/466* (2013.01); *H04L 67/02* (2013.01)

(58) Field of Classification Search
CPC ................................. G06F 9/466; H04L 67/02
See application file for complete search history.

(56) References Cited

U.S. PATENT DOCUMENTS 4,949,254 A 8/1990 Shorter
5,283,888 A 2/1994 Dao et al.
(Continued)

FOREIGN PATENT DOCUMENTS

CA 2975522 A1 8/2016
CN 1341238 A 3/2002
(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].
(Continued)

*Primary Examiner* — Sisley N Kim
(74) *Attorney, Agent, or Firm* — Knobbe, Martens, Olson & Bear LLP

(57) ABSTRACT

Systems and methods are described for providing virtualized transaction retries in an on-demand network code execution system. A user may generate a task on the system by submitting code. The task may include a transaction that can succeed or fail depending on external factors, such as accessing a resource that other processes are also trying to access. The system may obtain success criteria for evaluating whether the transaction was successful, and may configure a virtual machine instance to execute the submitted code. The system may generate a "snapshot" or otherwise capture information regarding the state of the virtual machine instance prior to executing the code, and may then execute the code or a portion of it to attempt the transaction. The system may then apply the success criteria to determine whether the transaction was successful, and if not may retry the transaction by restoring the snapshot and re-executing the code.

20 Claims, 6 Drawing Sheets

(56) References Cited

U.S. PATENT DOCUMENTS

| | | |
|---|---|---|
| 5,835,764 A | 11/1998 | Platt et al. |
| 5,970,488 A | 10/1999 | Crowe et al. |
| 5,983,197 A | 11/1999 | Enta |
| 6,237,005 B1 | 5/2001 | Griffin |
| 6,260,058 B1 | 7/2001 | Hoenninger et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,308,463 B2 | 12/2007 | Taulbee et al. |
| 7,340,522 B1 | 3/2008 | Basu et al. |
| 7,360,215 B2 | 4/2008 | Kraiss et al. |
| 7,558,719 B1 | 7/2009 | Donlin |
| 7,577,722 B1 | 8/2009 | Khandekar et al. |
| 7,590,806 B2 | 9/2009 | Harris et al. |
| 7,640,574 B1 | 12/2009 | Kim et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheifler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,296,267 B2 | 10/2012 | Cahill et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,392,558 B1 | 3/2013 | Ahuja et al. |
| 8,402,514 B1 | 3/2013 | Thompson et al. |
| 8,417,723 B1 | 4/2013 | Lissack et al. |
| 8,429,282 B1 | 4/2013 | Ahuja |
| 8,448,165 B1 | 5/2013 | Conover |
| 8,479,195 B2 | 7/2013 | Adams et al. |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,713,093 B1 | 4/2014 | Upadhyay et al. |
| 8,719,415 B1 | 5/2014 | Sirota et al. |
| 8,725,702 B1 | 5/2014 | Raman et al. |
| 8,756,322 B1 | 6/2014 | Lynch |
| 8,756,696 B1 | 6/2014 | Miller |
| 8,763,091 B1 | 6/2014 | Singh et al. |
| 8,769,519 B2 | 7/2014 | Leitman et al. |
| 8,793,676 B2 | 7/2014 | Quinn et al. |
| 8,799,236 B1 | 8/2014 | Azari et al. |
| 8,799,879 B2 | 8/2014 | Wright et al. |
| 8,806,266 B1 | 8/2014 | Qu et al. |
| 8,806,468 B2 | 8/2014 | Meijer et al. |
| 8,806,644 B2 | 8/2014 | McCorkendale et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,949,457 B1 | 2/2015 | Theroux et al. |
| 8,966,495 B2 | 2/2015 | Kulkarni |
| 8,972,980 B2 | 3/2015 | Banga et al. |
| 8,990,807 B2 | 3/2015 | Wu et al. |
| 8,997,093 B2 | 3/2015 | Dimitrov |
| 9,002,871 B2 | 4/2015 | Bulkowski et al. |
| 9,021,501 B2 | 4/2015 | Li et al. |
| 9,026,658 B2 | 5/2015 | Xu et al. |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,104,477 B2 | 8/2015 | Kodialam et al. |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,116,733 B2 | 8/2015 | Banga et al. |
| 9,130,900 B2 | 9/2015 | Tran |
| 9,141,410 B2 | 9/2015 | Leafe et al. |
| 9,146,764 B1 | 9/2015 | Wagner |
| 9,152,406 B2 | 10/2015 | De et al. |
| 9,154,955 B1 | 10/2015 | Bertz et al. |
| 9,164,754 B1 | 10/2015 | Pohlack |
| 9,176,871 B1 | 11/2015 | Serlet |
| 9,183,019 B2 | 11/2015 | Kruglick |
| 9,189,778 B1 | 11/2015 | Sh. Al-Rashidi |
| 9,195,520 B2 | 11/2015 | Turk |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,405,582 B2 | 8/2016 | Fuller et al. |
| 9,411,645 B1 | 8/2016 | Duan et al. |
| 9,413,626 B2 | 8/2016 | Reque et al. |
| 9,417,918 B2 | 8/2016 | Chin et al. |
| 9,430,290 B1 | 8/2016 | Gupta et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |

(56) References Cited

U.S. PATENT DOCUMENTS

| | | |
|---|---|---|
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,799,017 B1 * | 10/2017 | Vermeulen ........... G06Q 20/145 |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,002,036 B2 | 6/2018 | Fuchs et al. |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,191,861 B1 | 1/2019 | Steinberg |
| 10,193,839 B2 | 1/2019 | Tandon et al. |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,282,229 B2 | 5/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,496,547 B1 | 12/2019 | Naenko et al. |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,552,442 B1 | 2/2020 | Lusk et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,608,973 B2 | 3/2020 | Kuo et al. |
| 10,615,984 B1 | 4/2020 | Wang |
| 10,623,476 B2 | 4/2020 | Thompson |
| 10,637,817 B2 | 4/2020 | Kuo et al. |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,652,350 B2 | 5/2020 | Wozniak |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,732,951 B2 | 8/2020 | Jayanthi et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,824,484 B2 | 11/2020 | Wagner et al. |
| 10,831,898 B1 | 11/2020 | Wagner |
| 10,846,117 B1 | 11/2020 | Steinberg |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 11,010,188 B1 | 5/2021 | Brooker et al. |
| 11,016,815 B2 | 5/2021 | Wisniewski et al. |
| 11,099,870 B1 | 8/2021 | Brooker et al. |
| 11,099,917 B2 | 8/2021 | Hussels et al. |
| 11,115,404 B2 | 9/2021 | Siefker et al. |
| 11,119,809 B1 | 9/2021 | Brooker et al. |
| 11,119,813 B1 | 9/2021 | Kasaragod |
| 11,119,826 B2 | 9/2021 | Yanacek et al. |
| 11,126,469 B2 | 9/2021 | Reque et al. |
| 11,132,213 B1 | 9/2021 | Wagner |
| 11,146,569 B1 | 10/2021 | Brooker et al. |
| 11,159,528 B2 | 10/2021 | Siefker et al. |
| 11,188,391 B1 | 11/2021 | Sule |
| 11,190,609 B2 | 11/2021 | Siefker et al. |
| 11,231,955 B1 | 1/2022 | Shahane et al. |
| 11,243,819 B1 | 2/2022 | Wagner |
| 11,243,953 B2 | 2/2022 | Wagner et al. |
| 11,263,034 B2 | 3/2022 | Wagner et al. |
| 11,354,169 B2 | 6/2022 | Marriner et al. |
| 11,360,793 B2 | 6/2022 | Wagner et al. |
| 11,392,497 B1 | 7/2022 | Brooker et al. |
| 11,461,124 B2 | 10/2022 | Wagner et al. |
| 11,467,890 B2 | 10/2022 | Wagner |
| 11,550,713 B1 | 1/2023 | Piwonka et al. |
| 11,561,811 B2 | 1/2023 | Wagner |
| 2001/0044817 A1 | 11/2001 | Asano et al. |
| 2002/0083012 A1 | 6/2002 | Bush et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0177186 A1 | 9/2003 | Goodman et al. |
| 2003/0191795 A1 | 10/2003 | Bernardin et al. |
| 2003/0208569 A1 | 11/2003 | O'Brien et al. |

(56) References Cited

U.S. PATENT DOCUMENTS

| | | |
|---|---|---|
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0031448 A1 | 2/2006 | Chu et al. |
| 2006/0036941 A1 | 2/2006 | Neil |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0242709 A1 | 10/2006 | Seinfeld et al. |
| 2006/0248195 A1 | 11/2006 | Toumura et al. |
| 2006/0259763 A1 | 11/2006 | Cooperstein et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0067321 A1 | 3/2007 | Bissett et al. |
| 2007/0076244 A1 | 4/2007 | Suzuki et al. |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2007/0300297 A1 | 12/2007 | Dawson et al. |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0178278 A1 | 7/2008 | Grinstein et al. |
| 2008/0184340 A1 | 7/2008 | Nakamura et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2008/0307098 A1 | 12/2008 | Kelly |
| 2009/0006897 A1 | 1/2009 | Sarsfield |
| 2009/0013153 A1 | 1/2009 | Hilton |
| 2009/0018892 A1 | 1/2009 | Grey et al. |
| 2009/0025009 A1 | 1/2009 | Brunswig et al. |
| 2009/0005581 A1 | 2/2009 | Kondur |
| 2009/0034537 A1 | 2/2009 | Colrain et al. |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-Yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2009/0307430 A1 | 12/2009 | Bruening et al. |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0146004 A1 | 6/2010 | Sim-Tang |
| 2010/0169477 A1 | 7/2010 | Stienhans et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0298011 A1 | 11/2010 | Pelley et al. |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0035785 A1 | 2/2011 | Mihara |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |

(56) References Cited

U.S. PATENT DOCUMENTS

| | | |
|---|---|---|
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0208866 A1 | 8/2011 | Marmolejo-Meillon et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0110603 A1 | 5/2012 | Kaneko et al. |
| 2012/0124563 A1* | 5/2012 | Chung .................. G06F 9/467 717/140 |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324052 A1 | 12/2012 | Paleja et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0022771 A1 | 8/2013 | Barak et al. |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0205114 A1 | 8/2013 | Badam et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0332660 A1 | 12/2013 | Talagala et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |

(56) References Cited

U.S. PATENT DOCUMENTS

| | | |
|---|---|---|
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0164551 A1 | 6/2014 | Resch et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0258777 A1* | 9/2014 | Cheriton ............... G06F 11/141 714/19 |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0330936 A1 | 11/2014 | Factor et al. |
| 2014/0331222 A1 | 11/2014 | Zheng |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0351674 A1 | 11/2014 | Grube et al. |
| 2014/0359093 A1 | 12/2014 | Raju et al. |
| 2014/0359608 A1 | 12/2014 | Tsirkin et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0006487 A1 | 1/2015 | Yang et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0074675 A1 | 3/2015 | Qi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0212818 A1* | 7/2015 | Gschwind ............. H04L 9/3242 712/216 |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256514 A1 | 9/2015 | Laivand et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271073 A1 | 9/2015 | Salad et al. |
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0319174 A1 | 11/2015 | Hayton et al. |
| 2015/0324174 A1 | 11/2015 | Bromley et al. |
| 2015/0324182 A1 | 11/2015 | Barros et al. |
| 2015/0324210 A1 | 11/2015 | Carlson |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0198235 A1 | 7/2016 | Liu et al. |
| 2016/0203219 A1 | 7/2016 | Hoch et al. |
| 2016/0212007 A1 | 7/2016 | Alatorre et al. |

(56) References Cited

U.S. PATENT DOCUMENTS

| | | |
|---|---|---|
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0350124 A1* | 12/2016 | Gschwind ............ G06F 9/3834 |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378525 A1 | 12/2016 | Bjorkengren |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0032000 A1 | 2/2017 | Sharma et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0091235 A1 | 3/2017 | Yammine et al. |
| 2017/0091296 A1 | 3/2017 | Beard et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0142099 A1 | 5/2017 | Hinohara et al. |
| 2017/0147656 A1 | 5/2017 | Choudhary et al. |
| 2017/0149740 A1 | 5/2017 | Mansour et al. |
| 2017/0153965 A1 | 6/2017 | Nitta et al. |
| 2017/0161059 A1 | 6/2017 | Wood et al. |
| 2017/0177266 A1 | 6/2017 | Doerner et al. |
| 2017/0177441 A1 | 6/2017 | Chow |
| 2017/0177854 A1 | 6/2017 | Gligor et al. |
| 2017/0188213 A1 | 6/2017 | Nirantar et al. |
| 2017/0192825 A1 | 7/2017 | Biberman et al. |
| 2017/0221000 A1 | 8/2017 | Anand |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286187 A1 | 10/2017 | Chen et al. |
| 2017/0288878 A1 | 10/2017 | Lee et al. |
| 2017/0308520 A1 | 10/2017 | Beahan, Jr. et al. |
| 2017/0315163 A1 | 11/2017 | Wang et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0004575 A1 | 1/2018 | Marriner et al. |
| 2018/0003241 A1 | 2/2018 | Kang et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0113770 A1 | 4/2018 | Hasanov et al. |
| 2018/0121665 A1 | 5/2018 | Anderson et al. |
| 2018/0129684 A1 | 5/2018 | Wilson et al. |
| 2018/0144263 A1 | 5/2018 | Saxena et al. |
| 2018/0150339 A1 | 5/2018 | Pan et al. |
| 2018/0152401 A1 | 5/2018 | Tandon et al. |
| 2018/0152405 A1 | 5/2018 | Kuo et al. |
| 2018/0152406 A1 | 5/2018 | Kuo et al. |
| 2018/0192101 A1 | 7/2018 | Bilobrov |
| 2018/0225096 A1 | 8/2018 | Mishra et al. |
| 2018/0227300 A1 | 8/2018 | Nakic et al. |
| 2018/0239636 A1 | 8/2018 | Arora et al. |
| 2018/0253333 A1 | 9/2018 | Gupta |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0314845 A1 | 11/2018 | Anderson et al. |
| 2018/0316552 A1 | 11/2018 | Subramani Nadar et al. |
| 2018/0341504 A1 | 11/2018 | Kissell |
| 2018/0365422 A1 | 12/2018 | Callaghan et al. |
| 2018/0375781 A1 | 12/2018 | Chen et al. |
| 2019/0004866 A1 | 1/2019 | Du et al. |
| 2019/0018715 A1 | 1/2019 | Behrendt et al. |
| 2019/0028552 A1 | 1/2019 | Johnson, II et al. |
| 2019/0034095 A1 | 1/2019 | Singh et al. |
| 2019/0043231 A1 | 2/2019 | Uzgin et al. |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0102278 A1 | 4/2019 | Gahlin et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0171423 A1 | 6/2019 | Mishra et al. |
| 2019/0179678 A1 | 6/2019 | Banerjee et al. |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196884 A1 | 6/2019 | Wagner |
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0268152 A1 | 8/2019 | Sandoval et al. |
| 2019/0278938 A1 | 9/2019 | Greene et al. |
| 2019/0286475 A1 | 9/2019 | Mani |
| 2019/0286492 A1 | 9/2019 | Gulsvig Wood et al. |
| 2019/0303117 A1 | 10/2019 | Kocberber et al. |
| 2019/0311115 A1 | 10/2019 | Lavi et al. |
| 2019/0318312 A1 | 10/2019 | Foskett et al. |
| 2019/0324813 A1 | 10/2019 | Bogineni et al. |
| 2019/0339955 A1 | 11/2019 | Kuo et al. |
| 2019/0361802 A1 | 11/2019 | Li et al. |
| 2019/0363885 A1 | 11/2019 | Schiavoni et al. |
| 2019/0370113 A1 | 12/2019 | Zhang et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0034471 A1 | 1/2020 | Danilov et al. |
| 2020/0057680 A1 | 2/2020 | Marriner et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |
| 2020/0081745 A1 | 3/2020 | Cybulski et al. |
| 2020/0110691 A1 | 4/2020 | Bryant et al. |
| 2020/0120120 A1 | 4/2020 | Cybulski |
| 2020/0136933 A1 | 4/2020 | Raskar |
| 2020/0153798 A1 | 5/2020 | Liebherr |
| 2020/0153897 A1 | 5/2020 | Mestery et al. |
| 2020/0167208 A1 | 5/2020 | Floes et al. |
| 2020/0192646 A1 | 6/2020 | Yerramreddy et al. |
| 2020/0213151 A1 | 7/2020 | Srivatsan et al. |
| 2020/0327236 A1 | 10/2020 | Pratt et al. |
| 2020/0341799 A1 | 10/2020 | Wagner et al. |
| 2020/0349067 A1 | 11/2020 | Syamala et al. |
| 2020/0366587 A1 | 11/2020 | White et al. |
| 2020/0401455 A1 | 12/2020 | Church et al. |
| 2021/0019056 A1 | 1/2021 | Mangione-Tran |

(56) References Cited

U.S. PATENT DOCUMENTS

| | | |
|---|---|---|
| 2021/0081233 A1 | 3/2021 | Mullen et al. |
| 2021/0117534 A1 | 4/2021 | Maximov et al. |
| 2021/0232415 A1 | 7/2021 | Wagner et al. |
| 2021/0389963 A1 | 12/2021 | Wagner |
| 2022/0012083 A1 | 1/2022 | Brooker et al. |
| 2022/0391238 A1 | 12/2022 | Wagner |

FOREIGN PATENT DOCUMENTS

| | | |
|---|---|---|
| CN | 101002170 A | 7/2007 |
| CN | 101267334 A | 9/2008 |
| CN | 101345757 A | 1/2009 |
| CN | 101496005 A | 7/2009 |
| CN | 101627388 A | 1/2010 |
| CN | 101640700 A | 2/2010 |
| CN | 101764824 A | 6/2010 |
| CN | 102171712 A | 8/2011 |
| CN | 102365858 A | 2/2012 |
| CN | 102420846 A | 4/2012 |
| CN | 102761549 A | 10/2012 |
| CN | 103098027 A | 5/2013 |
| CN | 103140828 A | 6/2013 |
| CN | 103384237 A | 11/2013 |
| CN | 103731427 A | 4/2014 |
| CN | 104111848 A | 10/2014 |
| CN | 104243479 A | 12/2014 |
| CN | 104903854 A | 9/2015 |
| CN | 105122243 A | 12/2015 |
| CN | 108885568 A | 11/2018 |
| CN | 109478134 A | 3/2019 |
| CN | 109564525 A | 4/2019 |
| CN | 112513813 A | 3/2021 |
| EP | 2663052 A1 | 11/2013 |
| EP | 3201762 A1 | 8/2017 |
| EP | 3254434 A1 | 12/2017 |
| EP | 3356938 A1 | 8/2018 |
| EP | 3201768 B1 | 12/2019 |
| EP | 3811209 A1 | 4/2021 |
| EP | 3814895 A1 | 5/2021 |
| EP | 3857375 A1 | 8/2021 |
| EP | 4064052 A1 | 9/2022 |
| JP | 2002-287974 A | 10/2002 |
| JP | 2006-107599 A | 4/2006 |
| JP | 2007-080161 A | 3/2007 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011-257847 A | 12/2011 |
| JP | 2012-078893 A | 4/2012 |
| JP | 2012-104150 A | 5/2012 |
| JP | 2013-156996 A | 8/2013 |
| JP | 2014-525624 A | 9/2014 |
| JP | 2016-507100 A | 3/2016 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| JP | 7197612 B2 | 12/2022 |
| KR | 10-357850 B1 | 10/2002 |
| KR | 10-2021-0019533 A | 2/2021 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2015/149017 A1 | 10/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005829 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/006081 A1 | 1/2020 |
| WO | WO 2020/069104 A1 | 4/2020 |
| WO | WO 2020/123439 A1 | 6/2020 |
| WO | WO 2020/264431 A1 | 12/2020 |
| WO | WO 2021/108435 A1 | 6/2021 |

OTHER PUBLICATIONS

Adapter Pattern, Wikipedia, https://en.wikipedia.org/w/index.php?title=Adapter_pattern&oldid=654971255, [retrieved May 26, 2016], 6 pages.
Amazon, "AWS Lambda: Developer Guide", Jun. 26, 2016 Retrieved from the Internet, URL:http://docs.aws.amazon.com/lambda/latest/dg/lambda-dg.pdf, [retrieved on Aug. 30, 2017], 314 pages.
Amazon, "AWS Lambda: Developer Guide", Apr. 30, 2016 Retrieved from the Internet, URL: https://web.archive.org/web/20160430050158/http://docs.aws.amazon.com:80/lambda/latest/dg/lambda-dg.pdf, 346 pages.
Amazon, "AWS Lambda: Developer Guide", Retrieved from the Internet, 2019, URL : http://docs.aws.amazon.com/lambda/ latest/dg/lambda-dg.pdf, 521 pages.
Balazinska et al., Moirae: History-Enhanced Monitoring, Published: Jan. 2007, 12 pages.
Bebenita et al., "Trace-Based Compilation in Execution Environments without Interpreters," ACM, Copyright 2010, 10 pages.
Ben-Yehuda et al., "Deconstructing Amazon EC2 Spot Instance Pricing", ACM Transactions on Economics and Computation 1.3, Sep. 2013, 15 pages.
Bhadani et al., Performance evaluation of web servers using central load balancing policy over virtual machines on cloud, Jan. 2010, 4 pages.
Bryan Liston, "Ad Hoc Big Data Processing Made Simple with Serverless Map Reduce", Nov. 4, 2016, Amazon Web Services <https ://aws. amazon .com/bl ogs/compute/ad-hoc-big-data-processi ng-made-si mple-with-serverless-mapred uce >.
CodeChef ADMIN discussion web page, retrieved from https://discuss.codechef.eom/t/what-are-the-memory-limit-and-stack-size-on-codechef/14159, retrieved on Sep. 10, 2019.
CodeChef IDE web page, Code, Compile & Run, retrieved from https://www.codechef.com/ide, retrieved on Sep. 9, 2019.
Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, Nov. 2014, 13 pages.
Deis, Container, Jun. 2014, 1 page.
Dean et al, "MapReduce: Simplified Data Processing on Large Clusters", ACM, 2008, pp. 107-113.
Dombrowski, M., et al., Dynamic Monitor Allocation in the Java Virtual Machine, JTRES '13, Oct. 9-11, 2013, pp. 30-37.
Dornemann et al., "On-Demand Resource Provisioning for BPEL Workflows Using Amazon's Elastic Compute Cloud", 9th IEEE/ACM International Symposium on Cluster Computing and the Grid, 2009, pp. 140-147.
Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.
Ekanayake et al, "Twister: A Runtime for Iterative MapReduce", ACM, 2010, pp. 810-818.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

(56) References Cited

OTHER PUBLICATIONS

Fan et al., Online Optimization of VM Deployment in IaaS Cloud, Dec. 17, 2012-Dec. 19, 2012, 6 pages.
Ha et al., A Concurrent Trace-based Just-In-Time Compiler for Single-threaded JavaScript, utexas.edu, Jun. 2009.
Hammoud et al, "Locality-Aware Reduce Task Scheduling for MapReduce", IEEE, 2011, pp. 570-576.
Han et al., Lightweight Resource Scaling for Cloud Applications, May 13, 2012-May 16, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
http://www.codechef.com/ide web page from date Apr. 5, 2015, retrieved using the WayBackMachine, from https://web.archive.org/web/20150405045518/http://www.codechef.com/ide, 2015.
Huang, Zhe, Danny HK Tsang, and James She. "A virtual machine consolidation framework for mapreduce enabled computing clouds." 2012 24th International Teletraffic Congress (ITC 24). IEEE, Sep. 4, 2012-Sep. 7, 2012.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kim et al, "MRBench: A Benchmark for Map-Reduce Framework", IEEE, 2008, pp. 11-18.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Lagar-Cavilla et al., "SnowFlock: Virtual Machine Cloning as a First-Class Cloud Primitive", ACM Transactions on Computer Systems, vol. 29, No. 1, Article 2, Publication date: Feb. 2011, in 45 pages.
Lin, "MR-Apriori: Association Rules Algorithm Based on MapReduce", IEEE, 2014, pp. 141-144.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, Jul. 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Ryden et al., "Nebula: Distributed Edge Cloud for Data-Intensive Computing", IEEE, 2014, pp. 491-492.
Sakamoto, et al. "Platform for Web Services using Proxy Server"; Research Report from Information Processing Society, Mar. 22, 2002, vol. 2002, No. 31.
Search Query Report from IP.com, performed Dec. 2, 2020.
Search Query Report from IP.com, performed May 27, 2021.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, Nov. 10, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, Dec. 16, 2014-Dec. 19, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP status_codes web page, retrieved from https://en.wikipedia.org/wiki/List_of_HTTP status_codes, retrieved on Sep. 10, 2019.
Wikipedia Recursion web page from date Mar. 26, 2015, retrieved using the WayBackMachine, from https://web.archive.org/web/20150326230100/https://en.wikipedia.org/wiki/Recursion_(computer_science), 2015.
Wikipedia subroutine web page, retrieved from https://en.wikipedia.org/wiki/Subroutine, retrieved on Sep. 10, 2019.
Wood, Timothy, et al. "Cloud Net: dynamic pooling of cloud resources by live WAN migration of virtual machines." ACM Sigplan Notices 46.7 (2011): 121-132. (Year: 2011).
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yang, The Application of MapReduce in the Cloud Computing:, IEEE, 2011, pp. 154-156.
Yue et al., AC 2012-4107: Using Amazon EC2 in Computer and Network Security Lab Exercises: Design, Results, and Analysis, 2012, American Society for Engineering Education, Jun. 10, 2012.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
Office Action in Chinese Application No. 202110268031.5, dated Sep. 3, 2021.
Office Action in Canadian Application No. 2,962,633 dated May 21, 2020.
Office Action in Canadian Application No. 2,962,633 dated Jun. 18, 2021.
Office Action in European Application No. 19199402.9 dated Mar. 23, 2021.
Office Action in European Application No. 19199402.9 dated Dec. 3, 2021 in 4 pages.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.

(56) References Cited

OTHER PUBLICATIONS

Extended Search Report in European Application No. 19199402.9 dated Mar. 6, 2020.
Office Action in Japanese Application No. 2017-516160 dated Jan. 15, 2018.
Notice of Allowance in Japanese Application No. 2017-516160 dated May 8, 2018.
Office Action in Canadian Application No. 2,962,631 dated May 19, 2020.
Office Action in Canadian Application No. 2,962,631 dated May 31, 2021.
Office Action in Indian Application No. 201717013356 dated Jan. 22, 2021.
Office Action in Japanese Application No. 2017-516168 dated Mar. 26, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
Office Action in Indian Application No. 201717019903 dated May 18, 2020.
International Search Report and Written Opinion in PCT/US2015/064071 dated Mar. 16, 2016.
International Preliminary Report on Patentability in PCT/US2015/064071 dated Jun. 6, 2017.
Office Action in Australian Application No. 2016215438 dated Feb. 26, 2018.
Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.
Office Action in Indian Application No. 201717027369 dated May 21, 2020.
International Search Report and Written Opinion in PCT/US2016/016211 dated Apr. 13, 2016.
International Preliminary Report on Patentability in PCT/US2016/016211 dated Aug. 17, 2017.
Office Action in Chinese Application No. 201680020768.2 dated May 14, 2021 in 23 pages.
Office Action in Chinese Application No. 201680020768.2 dated Sep. 24, 2021 in 20 pages.
First Examination Report for Indian Application No. 201717034806 dated Jun. 25, 2020.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
Office Action in Chinese Application No. 2016800562398 dated Jun. 18, 2021.
International Search Report and Written Opinion in PCT/US2016/054774 dated Dec. 16, 2016.
Office Action in European Application No. 16781265.0 dated Jul. 13, 2020.
Office Action in Indian Application No. 201817013748 dated Nov. 20, 2020.
International Preliminary Report on Patentability in PCT/US2016/054774 dated Apr. 3, 2018.
Office Action in Chinese Application No. 201680072794X dated Jun. 22, 2021.
Office Action in European Application No. 16823419.3 dated Mar. 12, 2021.
International Search Report and Written Opinion in PCT/US2016/066997 dated Mar. 20, 2017.
International Preliminary Report on Patentability in PCT/US2016/066997 dated Jun. 26, 2018.
Office Action in Chinese Application No. 201780022789.2 dated Apr. 28, 2021.
Office Action in European Application No. 17776325.7 dated Apr. 12, 2021.
International Search Report and Written Opinion in PCT/US/2017/023564 dated Jun. 6, 2017.
International Preliminary Report on Patentability in PCT/US/2017/023564 dated Oct. 2, 2018.
Office Action in Chinese Application No. 2017800451968 dated May 26, 2021.
Office Action in Chinese Application No. 2017800451968 dated Dec. 3, 2021 in 20 pages.
Office Action in European Application No. 17740533.9 dated May 4, 2021.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Office Action in European Application No. 17743108.7 dated Dec. 22, 2020.
International Search Report and Written Opinion dated Oct. 15, 2019 for International Application No. PCT/US2019/039246 in 16 pages.
International Preliminary Report on Patentability dated Dec. 29, 2020 for International Application No. PCT/US2019/039246 in 8 pages.
Office Action in Japanese Application No. 2020-572441 dated Dec. 22, 2021 in 8 pages.
International Search Report for Application No. PCT/US2019/038520 dated Aug. 14, 2019.
International Preliminary Report on Patentability for Application No. PCT/US2019/038520 dated Dec. 29, 2020.
International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Preliminary Report on Patentability for Application No. PCT/US2019/065365 dated Jun. 8, 2021.
International Search Report for Application No. PCT/US2020/039996 dated Oct. 8, 2020.
International Preliminary Report on Patentability for Application No. PCT/US2020/039996 dated Jan. 6, 2022.
International Search Report for Application No. PCT/US2020/062060 dated Mar. 5, 2021.
Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UserGuide/ec2-ug.pdf (retrieved on Jul. 27, 2022] 795 pages.
Anonymous: "Amazon Simple Workflow Service Developer Guide API Version Jan. 25, 2012," Jun. 11, 2016 (Jun. 11, 2016), XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.
Anonymous: "AWS Flow Framework for Java," Apr. 7, 2016 (Apr. 7, 2016), XP055946535, Retrieved from the Internet: URL:https://

(56) References Cited

OTHER PUBLICATIONS web.archive.org/web/20160407214715if_/http://docs.aws.amazon.com/amazonswf/latest/awsflowguide/swf-aflow.pdf, [retrieved Jul. 27, 2022] in 139 pages.

Abebe et al., "EC-Store: Bridging the Gap Between Storage and Latency in Distribute Erasure Coded Systems", IEEE 38th International Conference on Distributed Computing Systems, 2018, pp. 255-266.

Huang et al., "Erasure Coding in Windows Azure Storege", USENIX, 2012 in 12 pages.

Rashmi et al., "EC-Cache: Load-Balance, Low-Latency Cluster Caching with Online Erasure Coding", USENIX, 2016, pp. 401-417.

International Preliminary Report on Patentability for Application No. PCT/US2020/062060 dated Jun. 9, 2022 in 9 pages.

\* cited by examiner

VIRTUALIZATION-BASED TRANSACTION HANDLING IN AN ON-DEMAND NETWORK CODE EXECUTION SYSTEM

CROSS-REFERENCE TO RELATED APPLICATIONS

This application is a continuation of U.S. patent application Ser. No. 16/447,797, now U.S. Pat. No. 11,119,809, entitled "VIRTUALIZATION-BASED TRANSACTION HANDLING IN AN ON-DEMAND NETWORK CODE EXECUTION SYSTEM" and filed on Jun. 20, 2019, which is hereby incorporated by reference herein in its entirety.

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

In some scenarios, a user can request that a data center provide computing resources to execute a particular task. The task may correspond to a set of computer-executable instructions, which the data center may then execute on behalf of the user. The data center may thus further facilitate increased utilization of data center resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
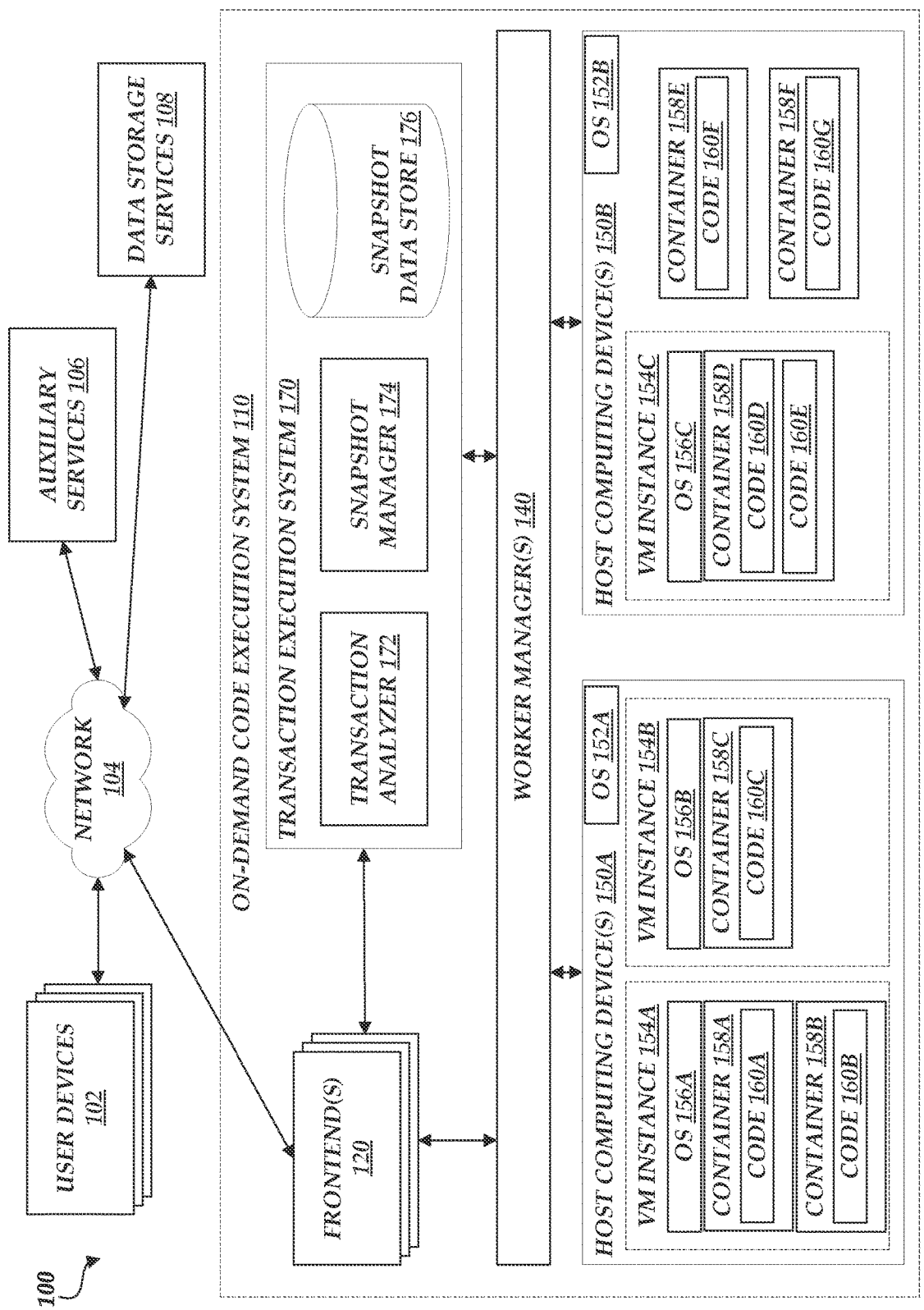
FIG. 1 is a block diagram depicting an illustrative environment in which an on-demand code execution system can execute tasks corresponding to code, which may be submitted by users of the on-demand code execution system, and can retry execution of submitted code in accordance with aspects of the present disclosure.

Generally described, aspects of the present disclosure relate to an on-demand code execution system. The on-demand code execution system enables rapid execution of code, which may be supplied by users of the on-demand code execution system. More specifically, embodiments of the present disclosure relate to improving the performance of an on-demand code execution system that is implemented using various computing resources. As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

The on-demand code-execution system may thus allow users to execute code in a serverless environment (e.g., one in which the underlying server is not under user control). The term "serverless environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment. Similarly, the term "server-based environment" is intended to refer to an environment in which a user is at least partly responsible for managing generation, configuration, or state of an underlying execution environment in addition to executing desired code in the environment. One skilled in the art will thus appreciate that "serverless" and "server-based" may indicate the degree of user control over execution environments in which code is executed, rather than the actual absence or presence of a server.

To further facilitate rapid execution of code, the on-demand code execution system may implement a transaction execution system as described herein. The transaction execution system may enable virtualization of transactions that have a possibility of succeeding or failing due to conditions that are external to the executing code, such as network congestion, contention for shared resources, intermittent hardware or software failure, maintenance activities, or other conditions that may cause a transaction to succeed at some times and fail at other times. The transaction execution system may illustratively handle code that performs such transactions by taking a "snapshot" of an execution environment prior to executing the transaction, executing the transaction and obtaining a result, and then restoring the snapshot and re-executing the code if the transaction is unsuccessful. The user-submitted code may thus be simplified by removing any error handling routines or retry mechanisms that manually implement recovering from a failed transaction attempt: Instead, the retries are automatically performed by the on-demand code execution system. It thus appears from the perspective of the user-submitted code that every transaction succeeds on the first try, since any transactions that fail are effectively "rewound" to a point in time before the failure and re-attempted. As a result, the user may not have to worry about implementing transaction tracking paradigms into the user-submitted code.

As will be appreciated by one of skill in the art in light of the present disclosure, the embodiments disclosed herein improve the ability of computing systems, such as on-demand code execution systems, to execute code in an efficient manner. Moreover, the presently disclosed embodiments address technical problems inherent within computing systems; specifically, the occurrence of intermittent failures in computing systems, and the difficulty of programmatically handling such failures when they occur. These technical problems are addressed by the various technical solutions described herein, including the provisioning of a transaction execution system within an on-demand code execution system that utilizes state-saving techniques (such as snapshots) to retry transactions externally to code that attempts the transaction, potentially providing to the code an appearance that transactions always succeed. Thus, the present disclosure represents an improvement on existing data processing systems and computing systems in general.

As described in more detail below, the on-demand code execution system may include a worker manager configured to receive user code (threads, programs, etc., composed in any of a variety of programming languages) and execute the code in a highly scalable, low latency manner, without requiring user configuration of a virtual machine instance. Specifically, the worker manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the worker manager receives user-initiated requests to execute code, and identifies a pre-configured virtual machine instance on which to execute the code based on configuration information associated with the request. The worker manager can further allocate the identified virtual machine instance to execute the user's code at least partly by creating and configuring containers inside the allocated virtual machine instance, and provisioning the containers with code of the task as well as any dependency code objects. Various embodiments for implementing a worker manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the disclosure herein described.

FIG. 1 is a block diagram of an illustrative operating environment 100 in which an on-demand code execution system 110 may operate based on communication with user computing devices 102, auxiliary services 106, and network-based data storage services 108. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programing interfaces (APIs), and/or other programmatic interfaces for generating and uploading user-executable code (including metadata identifying dependency code objects for the uploaded code), invoking the user-provided code (e.g., submitting a request to execute the user code on the on-demand code execution system 110), scheduling event-based jobs or timed jobs, tracking the user-provided code, and/or viewing other logging or monitoring information related to their requests and/or user code. Although one or more embodiments may be described herein as using a user interface, it should be appreciated that such embodiments may, additionally or alternatively, use any CLIs, APIs, or other programmatic interfaces.

The illustrative environment 100 further includes one or more network-based data storage services 108, which are configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the operating environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, and as described in more detail below, the on-demand code execution system 110 may configure the virtual machine instances with customized operating systems to execute the user's code more efficiency and reduce utilization of computing resources.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

A call to execute a task may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more worker managers 140 that manage the instances used for servicing incoming calls to execute tasks. In the example illustrated in FIG. 1, each worker manager 140 manages an active pool of virtual machine instances 154A-C, which are currently assigned to one or more users and are implemented by one or more physical host computing devices 150A-B. The physical host computing devices 150A-B and the virtual machine instances 154A-C may further implement one or more containers 158A-F, which may contain and execute one or more user-submitted codes 160A-G. Containers are logical units created within a virtual machine instance, or on a host computing device, using the resources available on that instance or device. For example, each worker manager 140 may, based on information specified in a call to execute a task, create a new container or locate an existing container 158A-F and assign the container to handle the execution of the task. Each container may correspond to an execution environment for the task, providing at least some isolation from other execution environments. For example, each container may provide a file system isolated from other file systems on the device, and code executing in the container may have limited or no access to other file systems or memory space associated with code executing outside of the container.

The containers 156A-F, virtual machine instances 154A-C, and host computing devices 150A-B may further include language runtimes, code libraries, or other supporting functions (not depicted in FIG. 1) that facilitate execution of user-submitted code 160A-G. The physical computing devices 150A-B and the virtual machine instances 154A-C may further include operating systems 152A-B and 156A-C. In various embodiments, operating systems 152A-B and 156A-C may be the same operating system, variants of the same operating system, different operating systems, or combinations thereof.

Although the virtual machine instances 154A-C are described here as being assigned to a particular user, in some embodiments, an instance 154A-C may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

The on-demand code execution system 110 further includes a transaction execution system 170, which implements aspects of the present disclosure including, for example, determining whether a task successfully completed a transaction. In some embodiments, the transaction execution system 170 includes a transaction analyzer 172, which may be invoked when the user submits code via the frontend 120 that includes a transaction. In some embodiments, as described in more detail below, the transaction analyzer 172 may analyze the user-submitted code to identify a transaction and determine criteria for evaluating whether the transaction was executed successfully. In other embodiments, the user may provide metadata or other information that identifies a transaction in their submitted code and provides one or more success criteria. The transaction analyzer 172 may, in some embodiments, obtain an output or other result associated with executing the task, and may apply the success criteria to the output to determine whether the transaction succeeded.

The transaction execution system 170 may further include a snapshot manager 174, which may capture state information regarding the particular host computing device 150A-B, virtual machine instance 154A-C, container 158A-F, and/or other computing resources that are used to execute the task. As described in more detail below, the snapshot manager 174 may capture the state information, store it (e.g., in the snapshot data store 176), and then use this information to restore a container 158A-F, virtual machine instance 154A-C, host computing device 150A-B, and/or other computing resource to a previous state, such as the state that existed just prior to attempting the transaction. The snapshot data store 176 may generally be any non-transient computer-readable storage medium, including but not limited to hard drives, tape drives, optical media, magnetic media, solid state devices, RAM, ROM, and the like.

In various embodiments, the transaction execution system 170 may be implemented as a component or components of a host computing device 150A or 150B, or the functionality of these devices and systems may be combined. For example, each of the host computing devices 150A-B may implement its own transaction execution system 170 as a local process that provides the recited functionality with regard to the virtual machine instances 154A-C and containers 158A-F executing on the respective host computing device 150A or 150B. Such implementations may reduce the number of inter-device interactions required to implement the described embodiments, and may thus reduce latency and overall use of computing resources. For ease of illustration, however, the transaction execution system 170 is depicted in FIG. 1 as a separate entity from the host computing devices 150A-B.

As shown in FIG. 1, various combinations and configurations of host computing devices 150A-B, virtual machine instances 154A-C, and containers 158A-F may be used to facilitate execution of user submitted code 160A-G. In the illustrated example, the host computing device 150A implements two virtual machine instances 154A and 154B. Virtual machine instance 154A, in turn, implements two containers 158A and 158B, which contain user-submitted code 160A and 160B respectively. Virtual machine instance 154B implements a single container 158C, which contains user-submitted code 160C. The host computing device 150B further implements a virtual machine instance 154C and directly implements containers 158E and 158F, which contain user-submitted code 160F and 160G. The virtual machine instance 154C, in turn, implements container 158D, which contains user-submitted codes 160D and 160E. It will be understood that these embodiments are illustrated for purposes of example, and that many other embodiments are within the scope of the present disclosure.

While some functionalities are generally described herein with reference to an individual component of the on-demand code execution system 110, other components or a combination of components may additionally or alternatively implement such functionalities. For example, a worker manager 140 may operate to provide functionality associated with execution of user-submitted code as described herein with reference to the transaction execution system 170.

Figure 2:
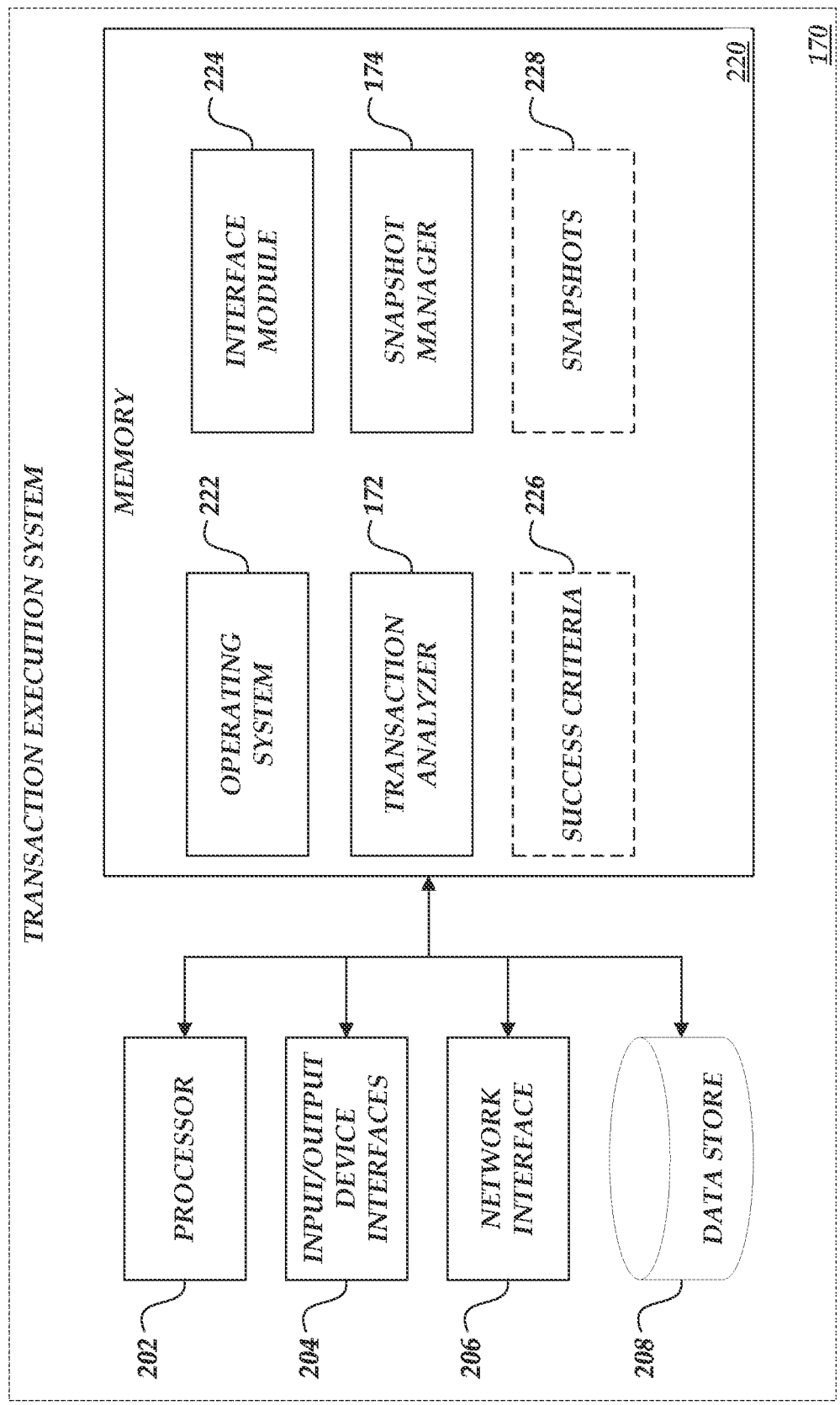
FIG. 2 depicts a general architecture of a computing device providing a transaction execution system that is configured to determine whether to retry code execution in the on-demand code execution system of FIG. 1.

FIG. 2 depicts a general architecture of a computing system (referenced as transaction execution system 170) that operates to determine whether and when all or part of a task should be re-executed within the on-demand code execution system 110. The general architecture of the transaction execution system 170 depicted in FIG. 2 includes an arrangement of computer hardware and software modules that may be used to implement aspects of the present disclosure. The hardware modules may be implemented with physical electronic devices, as discussed in greater detail below. The transaction execution system 170 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the transaction execution system 170 includes a processor 202, input/output device interfaces 204, a network interface 206, and a data store 208, all of which may communicate with one another by way of a communication bus. The network interface 206 may provide connectivity to one or more networks or computing systems. The processor 202 may thus receive information and instructions from other computing systems or services via the network 104. The processor 202 may also communicate to and from a memory 220 and further provide output information for an optional display (not shown) via the input/output device interfaces 204. The input/output device interfaces 204 may also accept input from an optional input device (not shown).

The memory 220 may contain computer program instructions (grouped as modules in some embodiments) that the processor 202 executes in order to implement one or more aspects of the present disclosure. The memory 220 generally includes random access memory (RAM), read only memory (ROM) and/or other persistent, auxiliary or non-transitory computer readable media. The memory 220 may store an operating system 222 that provides computer program instructions for use by the processor 202 in the general administration and operation of the transaction execution system 170. The memory 220 may further include computer program instructions and other information for implementing aspects of the present disclosure. For example, in one embodiment, the memory 220 includes an interface module 224 that generates interfaces (and/or instructions therefor) for interacting with the transaction execution system 170, e.g., via an API, CLI, and/or Web interface. In addition, the memory 220 may include and/or communicate with one or more data repositories (not shown), for example, to access user program codes and/or libraries.

In addition to and/or in combination with the interface module 224, the memory 220 may include a transaction analyzer 172 and an snapshot manager 174 that may be executed by the processor 202. In one embodiment, the transaction analyzer 172 and an snapshot manager 174 individually or collectively implement various aspects of the present disclosure, e.g., analyzing code or code execution to determine transaction results, restore previous execution states, and retry code execution, as described further below.

While the transaction analyzer 172 and an snapshot manager 174 are shown in FIG. 2 as part of the transaction execution system 170, in other embodiments, all or a portion of the transaction analyzer 172 and an snapshot manager 174 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the transaction execution system 170.

The memory 220 may further include success criteria 226, which may be loaded into memory in conjunction with a user-submitted request to execute a task on the on-demand code execution system 110. The transaction analyzer 172 may illustratively apply the success criteria 226 to an output or result of executing the code to determine whether to restore a snapshot and retry code execution, as described in more detail below. The memory 220 may further include snapshots 228, which may be generated by the snapshot manager 174 and may be used to restore a previous state of a container, virtual machine instance, or other computing resource.

In some embodiments, the transaction execution system 170 may further include components other than those illustrated in FIG. 2. For example, the memory 220 may further include user-submitted code, results of executing user-submitted code, or metadata or other information that was submitted with the request, such as an indication of which portion of the code is executed to perform a transaction. FIG. 2 is thus understood to be illustrative but not limiting.

Figure 3A:
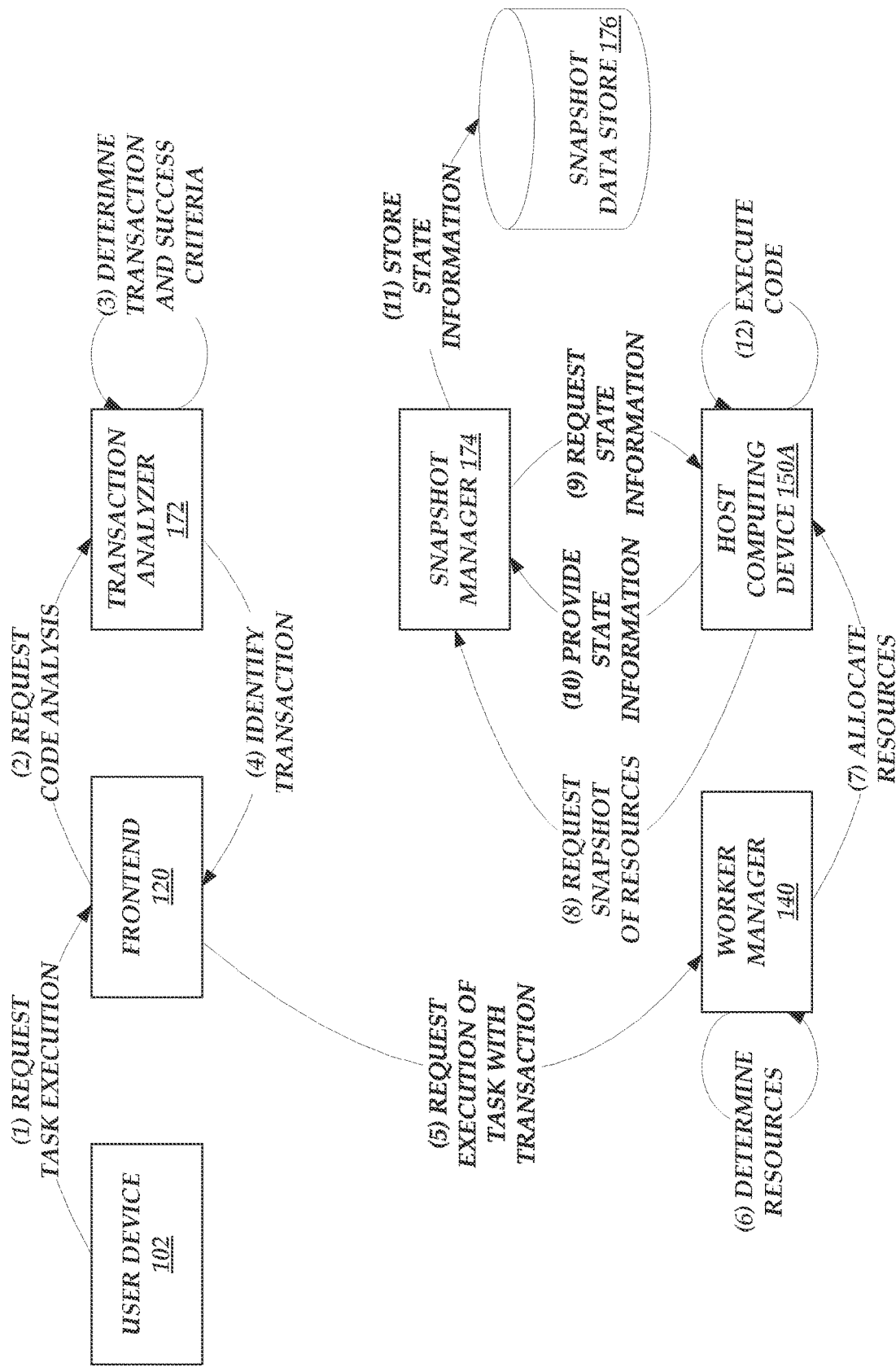
FIGS. 3A, 3B, and 3C are flow diagrams depicting illustrative interactions for submitting code corresponding to a task to the on-demand code execution system of FIG. 1, and for the on-demand code execution system to determine whether a task has succeeded and to retry execution of tasks that did not complete successfully.
Figure 3B:
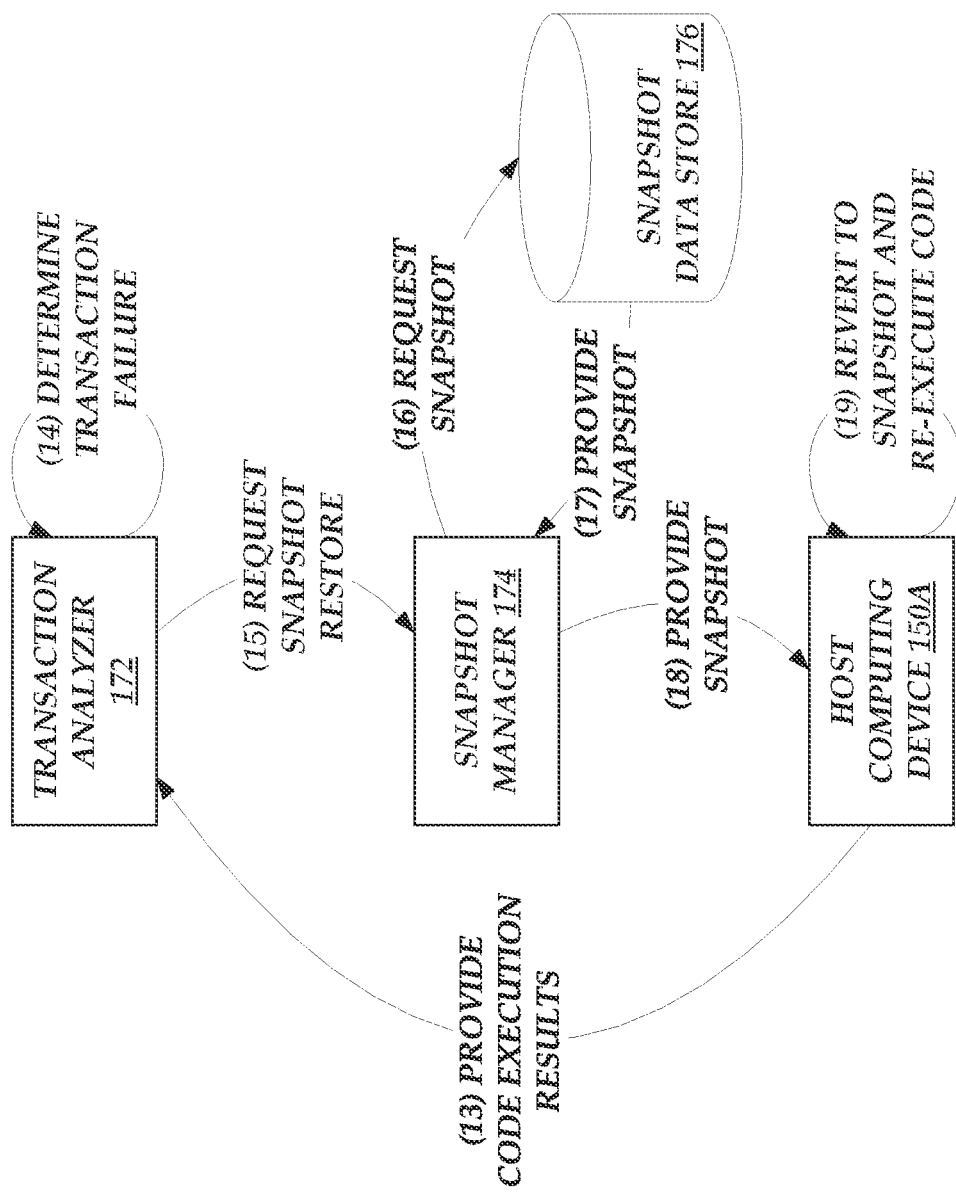
Figure 3C:
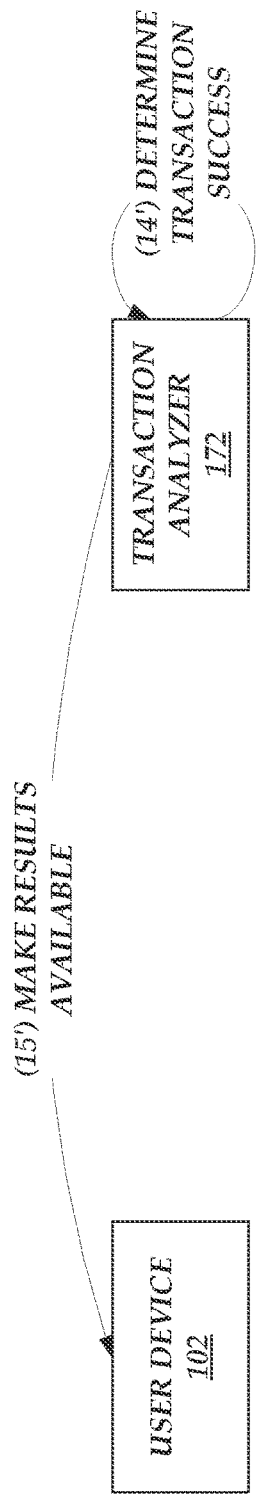

FIGS. 3A-3C depict illustrative interactions for virtualizing transaction retries in accordance with aspects of the present disclosure. With reference now to FIG. 3A, at (1), a user device 102 sends a request via a frontend 120 that an on-demand code execution system execute a particular task. The task may illustratively be associated with code that a user previously submitted to the on-demand code execution system, or in some embodiments code may be included as part of the request to execute a task. While the request is shown in FIG. 3A as stemming from the user device 102, in some embodiments, other devices may additionally or alternatively request task execution. For example, a different device external to the on-demand code execution system 110 (e.g., an auxiliary service 106) may request execution of a task. In some instances, the on-demand code execution system 110 itself may request execution of a task (e.g., by detecting fulfillment of a triggering event for the task).

At (2) the frontend 120 requests that the transaction analyzer 172 analyze the code to determine whether it includes a transaction. Generally described, a "transaction" may refer to code that attempts to access or change data and that has a possibility of success or failure depending on factors that are external to the code. At (3), the transaction analyzer 172 may illustratively identify a transaction based on metadata provided with the request, historical executions of the code, information included in the code, or other data. For example, the code may include particular statements or API calls (e.g., an instruction to access an external data store or shared resource) that the transaction analyzer 172 identifies as a transaction. As a further example, the transaction analyzer 172 may analyze previous executions of the code to determine a typical output pattern, such as a "success" status code or an expected response to a particular API call. In some embodiments, the on-demand code execution system may include code libraries or APIs in which particular calls are designated as transactional, and the transaction analyzer 172 may identify a transaction by determining that the code contains a function or API call that is known to invoke a transaction. In other embodiments, the user may designate sections of their code as being transactional in nature by inserting markers or statements (e.g., a beginTransaction or endTransaction statement) that allow the transaction analyzer 172 to identify these sections, or may provide metadata (e.g., information indicating that a transaction begins on line 72 of the code and ends on line 96) that facilitates identifying a transaction.

The transaction analyzer 172 may further determine success criteria associated with the identified transaction. In some embodiments, the success criteria may be defined or provided by the user (e.g., as metadata submitted in conjunction with the task). In other embodiments, the success criteria may be associated with obtaining a particular result that is pre-defined at the on-demand code execution system as being associated with a successful transaction or a failed transaction. For example, an API call that updates a record in a database may return a status code that indicates whether the update was successfully applied. As a further example, a command may attempt to read content from a shared data store, and may return the content if successful or silently fail if not. The transaction analyzer 172 may thus determine criteria for assessing whether the transaction succeeded based on known responses to identified transactions.

At (4), the transaction analyzer 172 reports to the frontend 120 that the code does contain a transaction, and provides any information that the frontend 120 may need to facilitate capturing a pre-transaction snapshot of the computing resources that execute the code and capturing a post-transaction result that can be analyzed to determine whether the transaction succeeded or failed. For example, the transaction analyzer 172 may identify a particular section of the code as corresponding to the transaction, and may indicate to the frontend 120 that a snapshot should be taken just prior to executing this section of the code. As a further example, the transaction analyzer 172 may identify the scope of computing resources to be included in the snapshot (e.g., that specific memory pages, register values, or other state information should be preserved).

In some embodiments, the interactions at (2), (3), and (4) may be carried out prior to receiving a request to execute the code. For example, the user may have previously submitted the code to on-demand code execution system, and the interactions at (2), (3), and (4) may be carried out at the time the code is submitted rather than waiting for a request to execute the code. In other embodiments, the interactions at (2), (3), and (4) may be carried out in conjunction with the user's initial request to execute the code, and subsequent requests to execute the code may obtain the results of these interactions rather than carrying them out again. One skilled in the art will appreciate that carrying out the interactions at (2), (3), and (4) prior to receiving a request to execute user-submitted code may reduce the time required to fulfill the request when it is received.

At (5), the frontend 120 sends a request to execute the code to the worker manager 140, and may provide all or part of the information supplied by the transaction analyzer 172. In some embodiments, the interaction at (5) may precede the interaction at (2), and the worker manager 140 may ask the transaction analyzer 172 to analyze code after receiving a request from the frontend to execute the code. In other embodiments, code may be submitted to the on-demand code execution system prior to making a request to execute the code, and the interactions at (2), (3) and (4) may be carried out at the time the code is submitted.

At (6), the worker manager 140 determines the resources that will be allocated to execute the requested code. Illustratively, the worker manager 140 may identify a host computing device (e.g., host computing device 150A), a virtual machine instance that is executing on the host computing device 150A (e.g., the virtual machine instance 154A depicted in FIG. 1), a container within a virtual machine instance (e.g., container 158A), other computing resources, or various combinations thereof.

At (7), the frontend 120 instructs the host computing device 150A to allocate the resources that were determined at (6) to execute the code containing the transaction. In various embodiments, the frontend 120 may instruct the host computing device 150A to execute the code in a new or existing virtual machine instance, a new or existing container, or to use other computing resources to execute the code.

At (8), the host computing device 150A interacts with the snapshot manager 174 to request a pre-transaction snapshot of the resources that will be allocated to the code execution request. In some embodiments, the interaction at (8) may take place while the code is being executed (e.g., during the interaction at (12)). For example, if the transaction analyzer 172 determines that a particular section of the code is associated with a transaction, then the interaction at (8) may occur when the host computing device 150A begins to execute that section. In other embodiments, the entire user-submitted code may be associated with the transaction, and the request to take a pre-transaction snapshot of resources may precede any code execution. In some embodiments, the request to take a pre-transaction snapshot may be carried out by the frontend 120 when determining or assigning the resources that will execute the code.

At (9), the snapshot manager 174 interacts with the host computing device 150A that will execute the user-submitted code to request state information. The state information may illustratively include information regarding the state of the host computing device 150A, the state of a virtual machine instance hosted on the host computing device 150A, the state of a container that is executing within a virtual machine instance (or directly on the host computing device 150A), or the state of another computing resource that is a component of or available to the host computing device 150A. At (10), the host computing device 150A provides the requested state information, which at (11) the snapshot manager 174 then stores in the snapshot data store 176. In some embodiments, the snapshot manager 174 may be a component of the host computing device 150A, and the interactions at (8), (9), (10), and (11) may be combined into fewer interactions (e.g., collecting and then storing state information).

In various embodiments, the snapshot manager 174 may preserve different types of state information relating to the computing environment in which the code will be executed. For example, the snapshot manager 174 may preserve the contents of virtual memory, the registers of a virtual processor, a local data store (e.g., a "scratch" partition or temporary folder), or other state information. In some embodiments, the snapshot manager 174 may begin logging changes to state information rather than preserving the state information. For example, on a virtual machine instance with a relatively large amount of memory, the snapshot manager 174 may implement a copy-on-write scheme and preserve only the portions of memory that are overwritten during execution of the transaction. In further embodiments, the snapshot manager 174 may determine that a virtual machine instance is in a known baseline state prior to execution of the user-submitted code, and may store information that identifies this state and facilitates returning to the baseline rather than storing particular memory contents or register values.

At (12), the host computing device 150A executes the code (or, in some embodiments, executes at least the portion of the code that corresponds to the transaction). In some embodiments, the transaction analyzer 172 may identify and warn the user regarding any code that causes "side effects" or would otherwise not be idempotent (e.g., code that increments a value or would otherwise cause a different result if run more than once). In other embodiments, the user who submits code to the on-demand code execution system must ensure that any code marked as being part of a transaction does not cause undesired side effects if executed repeatedly.

Turning now to FIG. 3B, at (13), the host computing device 150A reports the results of executing the transaction to the transaction analyzer 172. In some embodiments, the host computing device 150A may only communicate with the transaction analyzer 172 and/or the snapshot manager 174 via the frontend 120. In other embodiments, the host computing device 150A may interact directly with other components. In further embodiments, as described above, the transaction analyzer 172 and/or the snapshot manager 174 may be implemented as a component of the host computing device 150A, and the results may thus be obtained and analyzed locally rather than being reported. Further, in some embodiments, the host computing device 150A may detect that the transaction has completed without receiving or generating a report to that effect. For example, the host computing device 150A may determine that the code has reached or executed an endTransaction call, or has completed execution of a section of the code that is associated with the transaction.

At (14), in some embodiments, the transaction analyzer 172 may determine, based on the results output by the host computing device 150A and the criteria determined or obtained at (3), that the transaction did not succeed. For example, the transaction analyzer 172 may compare the result to the criteria to determine that the result contains an error code defined by the criteria (or that the result does not contain a success code defined by the criteria) and thus represents a failed transaction. The transaction analyzer 172 may thus, at (15), request that the snapshot manager 174 use the information captured during the interactions at (8), (9), and (10) to restore the host computing device 150A to its pre-transaction state. At (16), the snapshot manager 174 requests this information from the snapshot data store 176, and at (17) the snapshot data store 176 provides the information that was stored during the interaction at (10).

At (18), the snapshot manager 174 provides the snapshot information and instructs the host computing device 150A to restore the pre-transaction state of the resources that were used to execute the code. Thereafter, at (19), the host computing device 150A reverts to the pre-transaction state and re-executes the code. Illustratively, the host computing device 150A may use the information stored in the snapshot to restore memory contents, page tables, register values, and other computing resources to the state they had just prior to executing the transaction. The host computing device 150A may then repeat the interaction at (13) to resume execution of the code from the point at which the transaction began, and may again report the results of executing the code. The interactions at (14)-(19) may then be further repeated if the transaction has failed again. In some embodiments, the interactions at (13)-(19) may be repeated until a particular condition has been met, such as a maximum number of retries, a maximum time elapsed, a threshold amount of consumption of a computing resource, a "hard failure" (e.g., an indication that the transaction will never succeed), or other condition that prevents the interactions at (13)-(19) from being repeated indefinitely. For example, the host computing device 150A may keep track of the elapsed time since its first attempt to execute the transaction, and may stop further attempts to execute the transaction after a specified time period has elapsed. As a further example, the transaction analyzer 172 may apply criteria to determine that a particular error code found in the results of a failed transaction attempt (e.g., "403 Forbidden") indicates that the failure is not intermittent and cannot be overcome by repeating the same attempt.

Turning now to FIG. 3C, an alternate embodiment is described in which, at (14'), the transaction analyzer 172 determines that the transaction was successful based on the output obtained at (13) and the criteria determined or obtained at (3). Illustratively, the interaction at (14') may be reached after any number of repetitions of the interactions at (13)-(19), including no repetitions (i.e., the transaction may succeed on the first try). In some embodiments, the transaction analyzer 172 may, at (15'), make these results available to the user device 102. In other embodiments, the host computing device 150A may perform other actions after the transaction successfully completes. For example, the transaction analyzer 172 may report to the host computing device 150A that the transaction was successful, thereby enabling the host computing device 150A to continue executing the post-transaction portion of the code. The host computing device 150A may then, in some embodiments, make the results of executing the post-transaction code (or of executing the entire code) available to the user device 102. One skilled in the art will thus appreciate that the user-submitted code need not include any routines for handling an unsuccessful transaction, since the post-transaction portion of the code will only be reached if and when the transaction completes successfully. The user-submitted code may thus be simplified and made easier to maintain, and this shorter code will execute more quickly in scenarios where the transaction succeeds.

It will be understood that FIGS. 3A-3C are provided for purposes of example, and that many variations on the depicted interactions are within the scope of the present disclosure. For example, as described above, the transaction analyzer 172 may determine and provide information that allows the host computing device 150A to assess whether a transaction was successful, and the interactions at (13), (14), and (15) may thus be internal to the host computing device 150A rather than being carried out via the transaction analyzer 172. As a further example, the frontend 120 may act as an intermediary between the host computing device 150A and other computing devices (e.g., the auxiliary services 106 or data storage services 108 depicted in FIG. 1), and may determine whether transactions are successful by analyzing the responses received from the external computing devices. FIGS. 3A-3C are thus understood to be illustrative and not limiting.

Figure 4:
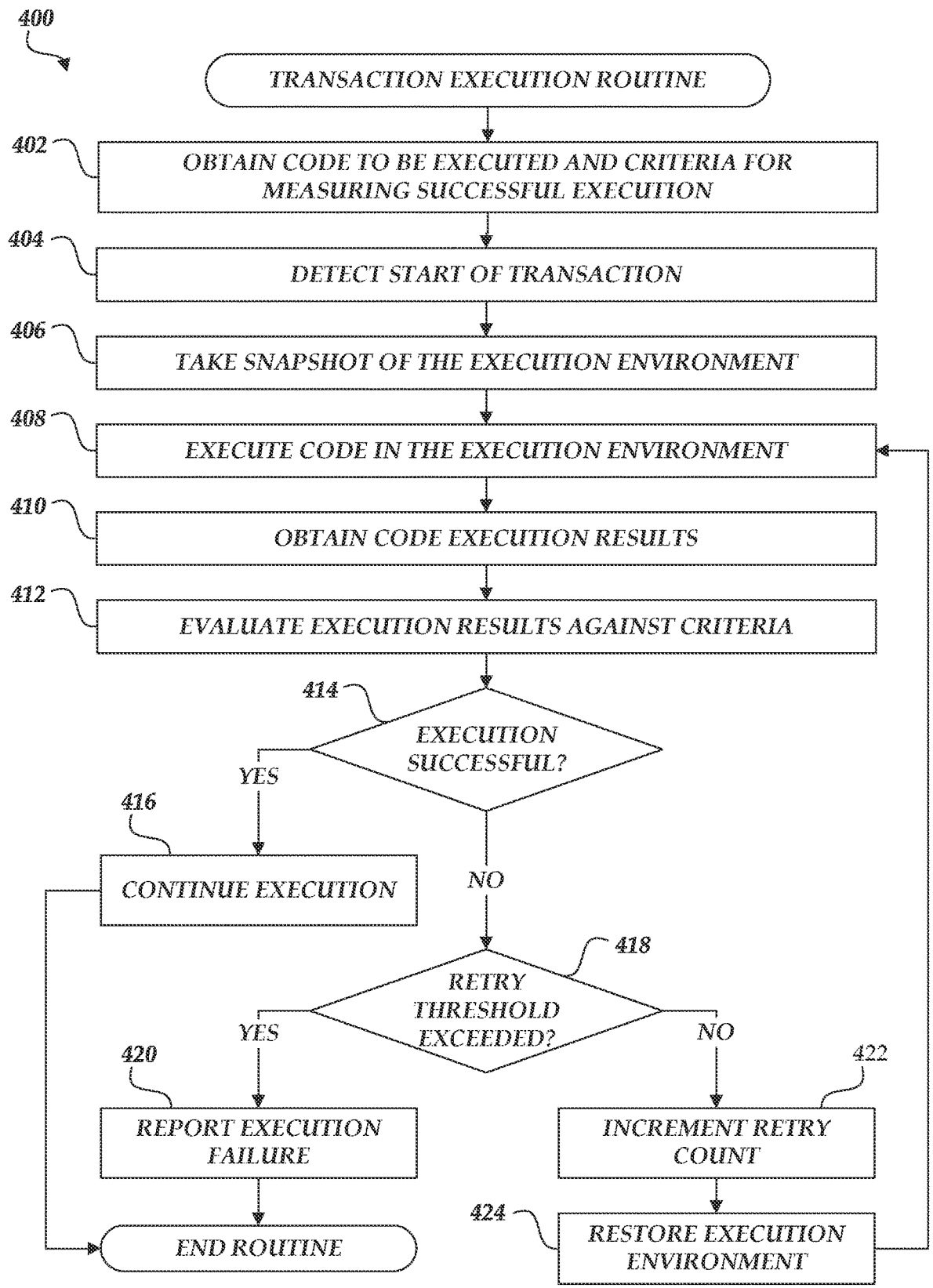
FIG. 4 is a flow chart depicting an illustrative routine for retrying execution of submitted code based on a measure of execution success in the on-demand code execution system of FIG. 1.

FIG. 4 is a flow diagram of an illustrative routine 400 for executing user-submitted code that contains a transaction.

The routine may be carried out, for example, by the transaction analyzer 172, the snapshot manager 174, or various combinations thereof. The routine 400 begins at block 402, where code to be executed and criteria for measuring successful execution may be obtained. In various embodiments, as described above, the criteria for measuring successful transaction execution may be obtained from the user, determined by analyzing the code, determined by analyzing previous executions of the code, defined in terms of, e.g., API calls returning particular result codes, and so forth.

At block 404, the start of a transaction may be detected. As described above, the start of a transaction may correspond to reaching a particular section of the code during execution, such as an API call that is known to invoke a transaction or a "beginTransaction" statement in the code. In some embodiments, the start of a transaction may correspond to the start of code execution, and a snapshot may thus be taken before any code is executed. In other embodiments, the start of a transaction may be determined based on activities performed by the code rather than an analysis of the code itself. For example, a transaction may be detected when the code attempts to obtain exclusive access to a shared resource, or when the code attempts to write a record to a database.

At block 406, a snapshot of the execution environment may be taken. In some embodiments, as described above, a change log may be created and maintained such that the pre-transaction execution environment can be recreated based on the change log. For example, the "snapshot" may be implemented as a copy-on-write scheme that retains information being overwritten from that point forward. In other embodiments, contents of memory pages, values of registers, network configurations, or other state information may be captured and stored. For example, where a task is executing in a virtual machine instance execution environment, a snapshot may be created by utilizing a "snapshot" functionality of a host operating system (e.g., a hypervisor), which functionality is known in the art. The execution environment may illustratively include any configuration of physical and/or virtual computing devices, including virtual machine instances, containers, host computing devices, data stores, and the like.

At block 408, the code obtained at block 402 may be executed in the execution environment. In some embodiments, a portion of the code may be executed prior to taking a snapshot at block 406 or may be executed prior to carrying out the routine 400. In further embodiments, only a portion of the code may be executed at block 408. For example, a transaction may be associated with a particular subroutine, statement, API call, block, function, or other portion of the code. At block 410, a result of executing the code may be obtained. In various embodiments, the result may include a status code (e.g., "200," "503," etc.) an object, a message, a register value, a pointer, or in some embodiments may be null (which may indicate success or failure). In some embodiments, a result may be obtained by inspecting the execution environment. For example, the contents of a virtual machine instance's memory, CPU registers, etc. may be analyzed to determine the outcome of executing the code. In further embodiments, the result may be obtained by monitoring communications between the execution environment and an external resource (e.g., a database, a storage service, etc.), or by monitoring the external resource directly.

At block 412, the execution results may be evaluated against the criteria obtained or determined at block 402. Illustratively, the results may be analyzed to determine whether they have a particular format, size, status code, error message, content, or otherwise compared to the success criteria. At decision block 414, a determination may be made as to whether the results satisfy the success criteria. If so, then at block 416 the code execution may be continued (or, in embodiments where the entire code corresponds to a transaction, completed) and the routine 400 ends. If not, then at decision block 418 a determination may be made as to whether the transaction should be retried. Illustratively, the determination may be as to whether a threshold number of retries has been exceeded, a threshold amount of time has elapsed, that the result indicates a "permanent" failure (e.g., a "403 Forbidden" error code), or that some other condition has been met. In some embodiments, a user-specified condition may be obtained and the determination at decision block 414 may be as to whether this condition has been met.

If the determination at decision block 418 is that the transaction should not be retried, then at block 420 the transaction's failure to execute may be reported. Illustratively, a notification may be provided to a user requesting that the code be executed, or to the computing device from which a request was obtained. In some embodiments, other code may be obtained and executed in response to a transaction failure. If the determination at decision block 418 is that the transaction should be retried, then the routine 400 branches to block 422, where in some embodiments a retry count may be incremented, and then to block 424, where the pre-transaction execution environment may be restored. The routine 400 then returns to block 408, and re-executes the code iteratively until either an attempt meets the success criteria or a determination is made that no further retries should be attempted.

In various embodiments, the transaction execution routine 400 may include more, fewer, different, or different combinations of blocks than those depicted in FIG. 4. For example, the routine 400 may, in some embodiments, output the results of executing the transaction rather than continuing execution at block 414. As a further example, in embodiments where the entire code corresponds to a transaction, block 414 may be omitted and the routine 400 may end after the transaction completes successfully. As a further example, blocks 408, 410, and 412 may be combined, and the routine 400 may evaluate execution results as it obtains them (e.g., by determining whether a "success" status code can be obtained). The routine 400 depicted in FIG. 4 is thus understood to be illustrative and not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A computer-implemented method comprising:
    obtaining a request to execute user-submitted code on an on-demand code execution system, wherein the user-submitted code is associated with metadata that identifies a portion of the user-submitted code as including a transaction;
    causing the on-demand code execution system to configure a virtual computing environment to execute the user-submitted code;
    generating a snapshot of the virtual computing environment when execution of the user-submitted code reaches a first statement in the user-submitted code, the first statement associated with a start of the transaction;
    causing the on-demand code execution system to perform a first execution of the transaction within the virtual computing environment;
    determining, based at least in part on a result obtained from the first execution, that the first execution was not successful, wherein the result is generated based at least in part on the execution of the user-submitted code reaching a second statement associated with an end of the transaction;
    causing the on-demand code execution system to restore the snapshot of the virtual computing environment, wherein restoring the snapshot of the virtual computing environment changes an execution state of the user-submitted code from a state corresponding to the second statement to a state corresponding to the first statement; and
    causing the on-demand code execution system to perform a second execution of the transaction within the virtual computing environment.

2. The computer-implemented method of claim 1, wherein the request includes the metadata.

3. The computer-implemented method of claim 1, wherein the metadata includes a success criterion.

4. The computer-implemented method of claim 3, wherein determining that the first execution was not successful comprises determining that the result obtained from the first execution does not satisfy the success criterion.

5. The computer-implemented method of claim 3, wherein the success criterion specifies that the result includes an expected response to the transaction.

6. The computer-implemented method of claim 1, wherein the metadata includes a retry criterion.

7. The computer-implemented method of claim 6, wherein the retry criterion specifies one of more of a threshold number of retries to attempt or a threshold amount of time during which to attempt retries.

8. The computer-implemented method of claim 7 further comprising:

causing the on-demand code execution system to perform a second execution of the transaction within the virtual computing environment;
determining, based at least in part on a result obtained from the second execution, that the second execution was not successful;
determining that the retry criterion is no longer satisfied; and
transmitting a report to a sender of the request to execute the user-submitted code, the report indicating that execution of the user-submitted code was unsuccessful.

9. A system comprising:
a non-transitory data store configured to store computer-executable instructions; and
a processor in communication with the non-transitory data store, wherein the computer-executable instructions, when executed by the processor, configure the processor to perform operations including:
 causing an on-demand code execution system to configure a virtual computing environment to execute user-submitted code, wherein the user-submitted code is associated with metadata that identifies a portion of the user-submitted code as including a transaction;
 generating a snapshot of the virtual computing environment when execution of the user-submitted code reaches a first statement in the user-submitted code, the first statement associated with a start of the transaction;
 causing the on-demand code execution system to perform a first execution of the transaction within the virtual computing environment;
 determining, based at least in part on a result obtained from the first execution, that the first execution was not successful, wherein the result is obtained after the execution of the user-submitted code reaches a second statement in the user-submitted code, the second statement associated with an end of the transaction;
 causing the on-demand code execution system to restore the snapshot of the virtual computing environment, wherein restoring the snapshot changes an execution state of the user-submitted code from a state corresponding to the second statement to a state corresponding to the first statement; and
 causing the on-demand code execution system to perform a second execution of the transaction within the virtual computing environment.

10. The system of claim 9, wherein the metadata is generated by a transaction analyzer.

11. The system of claim 9, wherein the metadata is submitted with a request to execute the user-submitted code.

12. The system of claim 9, wherein the metadata is included in the user-submitted code.

13. The system of claim 9, wherein the metadata includes one or more of a line number identifying a line of the user-submitted code, a marker or statement in the user-submitted code, or an indication that a function or API call in the user-submitted code is known to invoke a transaction.

14. The system of claim 9, wherein the non-transitory data store is configured to store further computer-executable instructions that, when executed by the processor, configure the processor to perform further operations including:
 identifying, based at least in part on the transaction, a set of computing resources to include in the snapshot of the virtual computing environment.

15. The system of claim 14, wherein generating the snapshot comprises one or more of preserving all or part of contents of the set of computing resources, logging changes to the set of computing resources, determining that the virtual computing environment is in a known baseline state, or preserving a network configuration.

16. The system of claim 9, wherein the non-transitory data store is configured to store further computer-executable instructions that, when executed by the processor, configure the processor to perform further operations including:
 determining that the portion of the user-submitted code corresponding to the transaction causes a side effect if executed repeatedly, wherein causing the on-demand code execution system to restore the snapshot of the virtual computing environment does not restore the side effect to its original state; and
 generating and transmitting a warning regarding the side effect.

17. Non-transitory computer-readable media including computer-executable instructions that, when executed by a processor, cause the processor to perform operations including:
 causing an on-demand code execution system to execute user-submitted code in a virtual computing environment, wherein the user-submitted code is associated with metadata that identifies a portion of the user-submitted code as including a transaction;
 obtaining a state of the virtual computing environment when execution of the user-submitted code reaches a first location in the user-submitted code, the first location being associated with a start of the transaction;
 determining, based at least in part on a result obtained when the execution of the user-submitted code reaches a second location in the user-submitted code, the second location being associated with an end of the transaction, that a success criterion has not been satisfied;
 restoring the state of the virtual computing environment to that obtained when the execution of the user-submitted code reached the first location in the user-submitted code; and
 performing a second execution of the at least a portion of the user-submitted code within the virtual computing environment.

18. The non-transitory computer-readable media of claim 17, wherein the metadata specifies one or more of a maximum number of retries, a maximum time elapsed, a threshold amount of consumption of a computing resource, or an indication that the transaction will never succeed.

19. The non-transitory computer-readable media of claim 17, wherein the result comprises one of more of a status code, object, message, register value, pointer, or null value.

20. The non-transitory computer-readable media of claim 17, wherein the result is obtained by one or more of monitoring communications between the virtual computing environment and an external resource, monitoring the external resource, or inspecting the virtual computing environment.

* * * * *